United States Patent [19]
Burtis

[11] 4,106,361
[45] Aug. 15, 1978

[54] GEAR PUMP, GEAR AND METHOD

[75] Inventor: Wilson A. Burtis, Westminster, Calif.

[73] Assignee: Wyle Laboratories, El Segundo, Calif.

[21] Appl. No.: 735,324

[22] Filed: Oct. 26, 1976

[51] Int. Cl.² .................. F16H 55/06; F16H 1/28; B23F 9/04

[52] U.S. Cl. .................................... 74/462; 74/802; 90/8

[58] Field of Search ............... 74/462, 802; 90/8

[56] References Cited

U.S. PATENT DOCUMENTS

| | | | |
|---|---|---|---|
| 1,341,846 | 6/1920 | Gollings | 74/462 X |
| 1,646,374 | 10/1927 | Wilkin | 74/462 |
| 1,833,159 | 11/1931 | Garnett | 74/462 |
| 3,345,883 | 10/1967 | Glocker | 74/462 |
| 3,890,853 | 6/1975 | Feltz | 74/462 X |

*Primary Examiner*—Leonard H. Gerin

*Attorney, Agent, or Firm*—Lindenberg, Freilich, Hornbaker, Wasserman, Rosen & Fernandez

[57] ABSTRACT

A relatively simple gear-forming process is disclosed, which enables the production of a set of gears that is especially useful for a particular type of gear pump, and which also produces a set of gears which operates with a high degree of rolling contact. The gears are produced by first forming an initial cutter gear having teeth with cylindrical tips supported by narrow supports, and using this initial cutter on a gear shaper to cut a first gear having bullet-shaped teeth. The first gear can then be used as the cutter on a gear shaper to cut other gears with bullet-shaped teeth or to cut gears with pole-shaped teeth. In a gear pump wherein fluid is forced through an axial passage opening into the space between teeth of the sun gear, the sun gear is formed with pole-shaped teeth while the planetary gear is formed with bullet-shaped teeth.

7 Claims, 9 Drawing Figures

GEAR PUMP, GEAR AND METHOD

BACKGROUND OF THE INVENTION

This invention relates to a novel gear-production method, novel gears resulting therefrom, and a gear pump utilizing a set of such gears.

My earlier U.S. Pat. No. 3,259,073 discloses a gear pump wherein a sun gear is provided with radial passages leading from an axial hole to the space between adjacent teeth, and planetary gears are provided which force fluid into the passages. The teeth of the sun and planetary gears must be designed so that as a planetary gear tooth enters the space between a pair of sun gear teeth there is substantially contact of the planetary gear tooth with a sun gear teeth to prevent the escape of fluid. The design of a pair of gears for achieving such interfitting, especially where contact must begin early during the engagement of a tooth in order to trap a large volume, is extremely difficult.

SUMMARY OF THE INVENTION

In accordance with one embodiment of the present invention, a gear set is provided which can easily be produced, and which operates effectively in a gear pump of the type wherein the planetary gear forces fluid into a radial passage of the sun gear. A set of gears can be constructed by first forming an initial cutter gear whose teeth have tips forming at least 180° of a cylinder. This initial cutter is utilized on a gear shaper to form a second gear, with only the cylindrical tips of the initial cutter cutting away material of the gear blank. The second gear is then used as a cutter to cut the sun gear and planetary gears of the gear pump, using the second gear as the cutter on a gear shaper. When operating the gear shaper to form planetary gears, the axes of the cutter and gear blank are held far enough apart to form bullet shaped gears, while when cutting the sun gear, the axes of the cutter and gear blank are held close enough together to form narrow pole-shaped teeth.

Planetary gear teeth can be utilized in a gear train, because the meshing planetary gears substantially roll on one another along wide areas of their teeth, to minimize friction and reduce wear.

The novel features of the invention are set forth with particularity in the appended claims. The invention will be best understood from the following description when read in conjunction with the accompanying drawings.

DESCRIPTION OF THE PREFERRED EMBODIMENT

Figure 1:
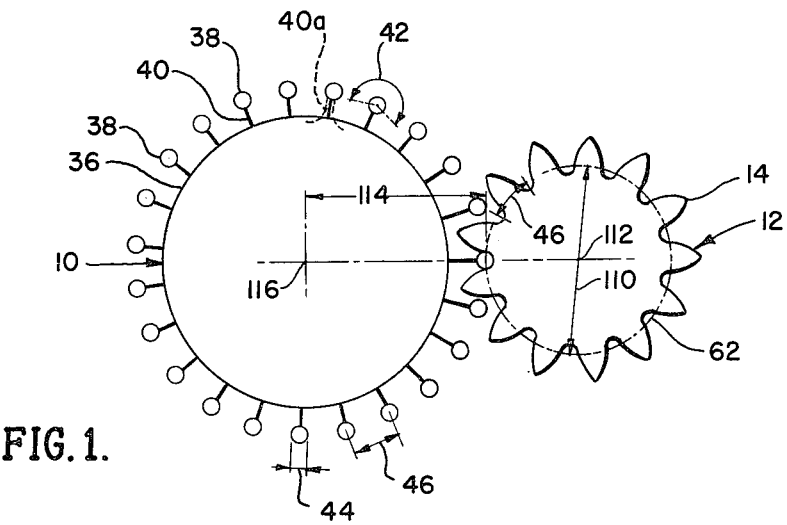
FIG. 1 is a simplified plan view showing the development of a gear with bullet-shaped teeth, utilizing an initial simple gear as the cutter on a gear shaper.
Figure 2:
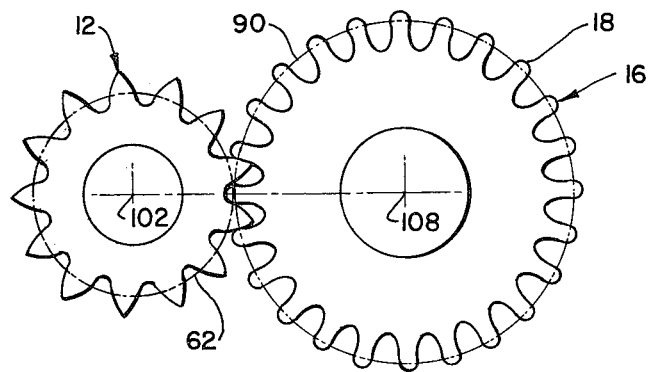
FIG. 2 is a plan view showing how the developed gear of FIG. 1 is utilized as the cutter on a gear shaper to shape a sun gear.
Figure 3:
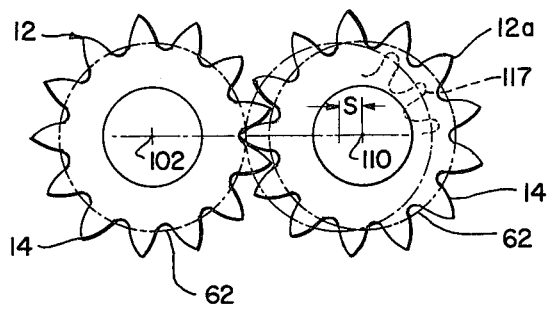
FIG. 3 is a plan view showing how the developed gear of FIG. 1 is utilized as the cutter on a gear shaper to produce a planetary gear with bullet shaped teeth similar to those of the cutter.
Figure 4:
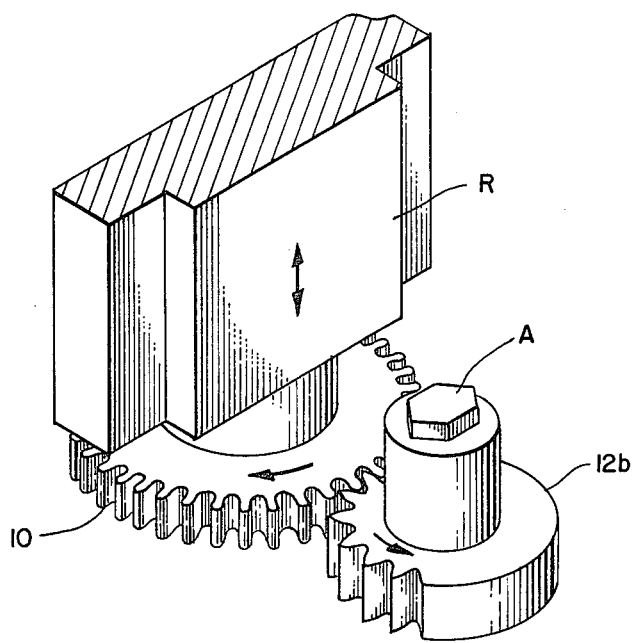
FIG. 4 is a simplified perspective view showing the operation of a gear shaper during the process illustrated in FIG. 1.

FIG. 1 shows an initial cutter 10 being utilized as the cutter on a gear shaper to form a gear 12 with bullet-shaped teeth 14. The manner of operation of a gear shaper is shown in FIG. 4, wherein it can be seen that the cutter 10 is rotatably mounted on a ram R that moves up and down, while a gear blank 12b is mounted on an axle A that rotates. The cutter 10 and blank 12b slowly rotate in the indicated directions, while the ram R moves up and down, so that the cutter generates teeth on the blank. This process is also utilized as illustrated in FIG. 2, to cut another gear 16 with narrow post-like teeth 18, utilizing the bullet gear 12 as the cutter. The bullet gear 12 also can be utilized, as indicated in FIG. 3, to generate another gear 12A with bullet-shaped teeth of the same shape as those of the gear 12.

Figure 6:
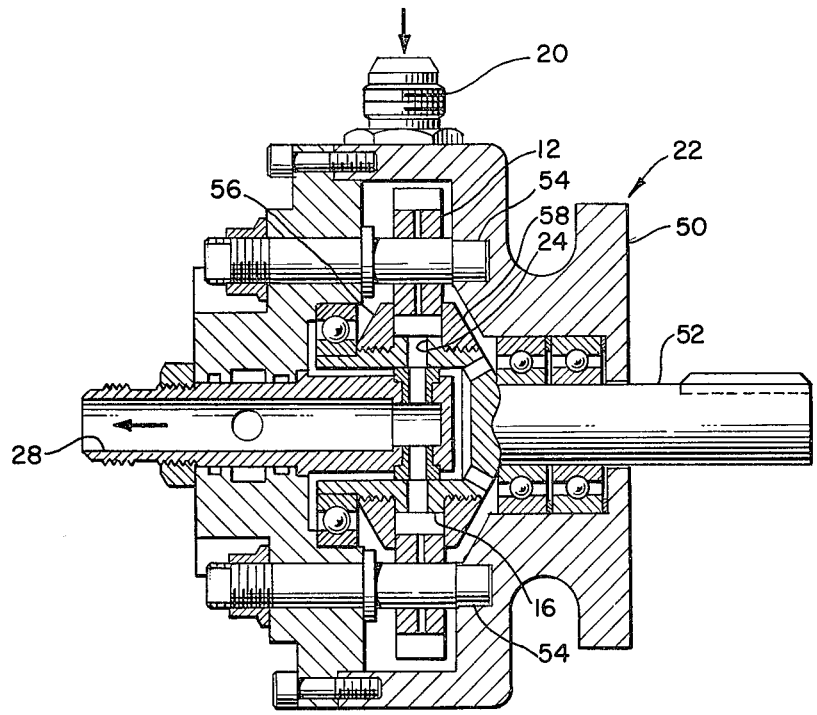
FIG. 6 is a sectional side view of a gear pump of the type with radial passages in the sun gear, constructed in accordance with the present invention.
Figure 7:
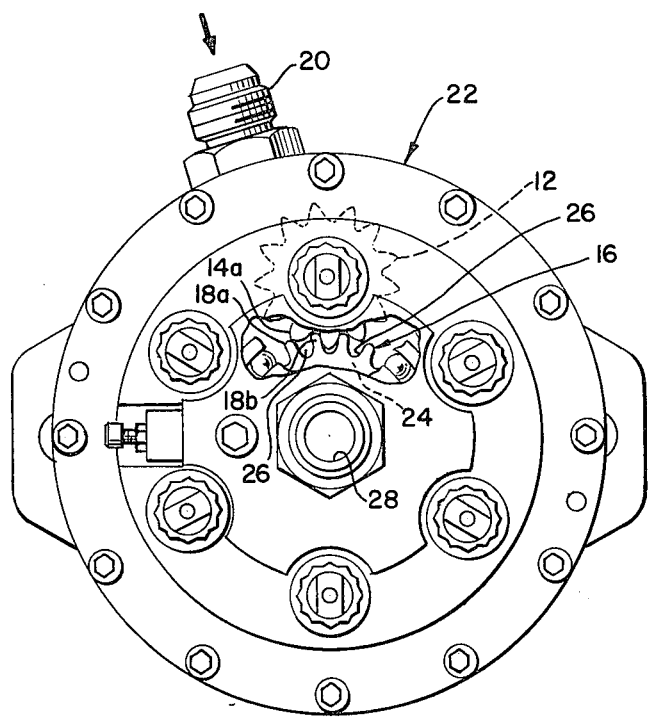
FIG. 7 is a front view of the pump of FIG. 6, with a portion thereof cut away to show the manner of gear meshing.

The two gears 12, 16 of FIG. 2 can be utilized in a special gear pump of the type illustrated in FIGS. 6 and 7 wherein the gear 16 serves as a central or sun gear while the gear 12 serves as a planetary gear engaged with the sun gear. As shown in FIG. 6, the pump 22 includes a housing 50 with an inlet 20 for receiving a fluid and an outlet 28 for discharging fluid under pressure. A sun gear 16 is rotatably mounted on a central shaft 52 which is driven by a motor (not shown) and a group of six planetary gears 12 are mounted on six axles 54 spaced about the sun gear. A pair of side plates 56, 58 lie on either side of the sun gear 16, and each planetary gear 12 fits closely between the side plates 56, 58. Fluid to be pumped enters an inlet 20 of the pump and flows into the region surrounding the gears 12 and 16. The sun gear has radial passages 24 (FIG. 6) that lead from the space 26 between its teeth to an outlet 28 at the center of the sun gear. As the gears 12, 16 rotate, a tooth 14a of the planetary gear begins entering the space or recess 26 between two teeth 18a and 18b of the sun gear. During the next approximately 25 degrees of rotation of the planetary gear, its tooth 14a enters continually deeper into the recess 26 between the teeth 18a, 18b to force fluid therein down through a corresponding radial passage 24 into the outlet 28 of the pump. In this way, fluid can be efficiently moved by the gear pump. This type of pump is shown in my U.S. Pat. No. 3,259,073.

Figure 8:
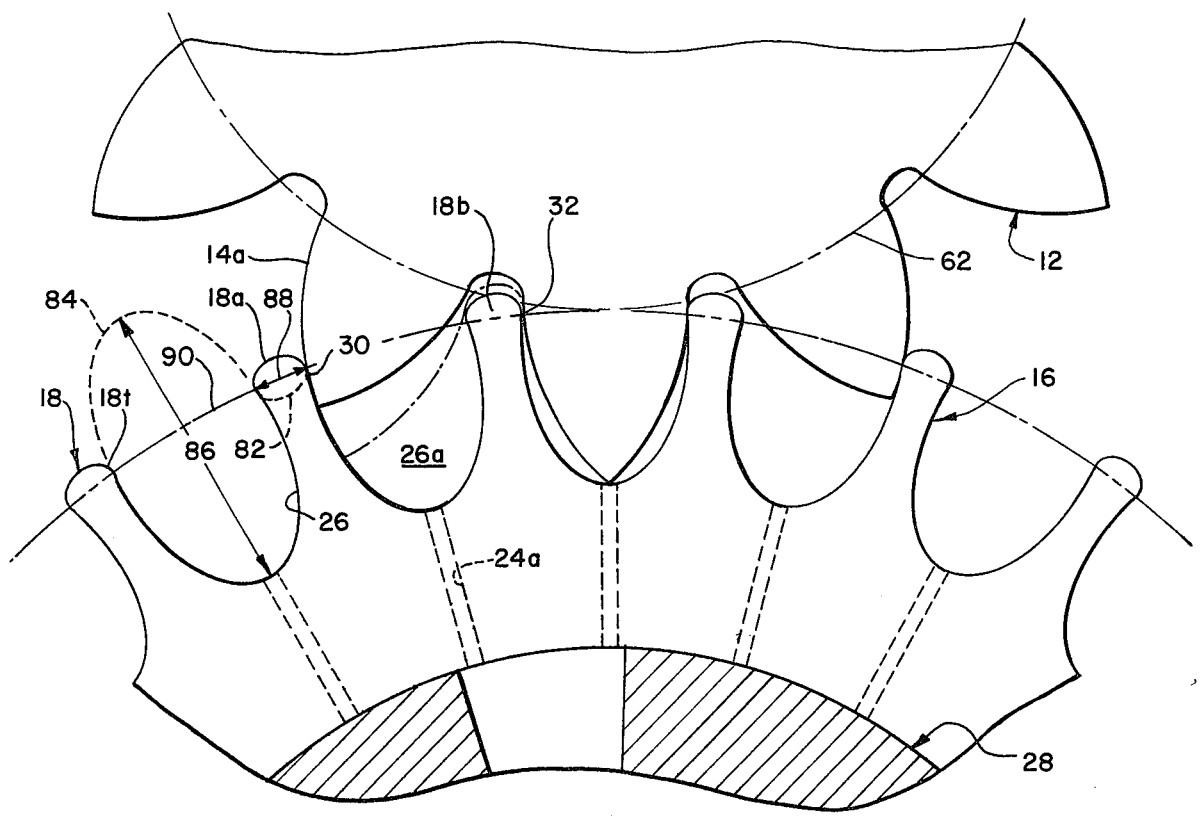
FIG. 8 is an enlarged view of a portion of the pump of FIG. 7.

As shown in FIG. 8, efficient pumping of fluid requires that the leading portion of the tooth make contact with, or come extremely close to, a side of the sun gear tooth 18a such as at the point 30. Such substantial contact is required to assure that the fluid in the space 26a will be pumped down into the radial passage 24a instead of leaking past the planetary tooth 14a. It may be noted that the other side of the cavity 26a is sealed by virtue of contact of the next planetary tooth at point 32 with a side of the sun gear tooth 18b. In addition to the necessity for substantial sealing contact of the gear teeth, it is also necessary for substantial contact, such as at 30, to occur near the beginning of entry of the tooth 14a into the recess 26a in order for a large amount of fluid to be trapped in the recess of 26a. This assures that considerable fluid will be pumped and therefore a pump of small size will have a large pumping capacity.

The design of a sun gear and planetary gear combination which will achieve the two requirements, that there be relatively good sealing of the sun gear recesses and that a relatively high volume of fluid be pumped in the course of engagement of each planetary tooth with the sun gear, can be extremely difficult. Even after such a gear set is designed, it is difficult to accurately grind a set of gears so that they will run accurately on one another. The gear set developed by the processes illustrated in FIGS. 1 and 2, results in the development of two gears 12, 16 which can be utilized respectively as the planetary and sun gears in the pump of FIGS. 6 and 7, with additional planetary gears being easily produceable by the method shown in FIG. 3.

The initial cutter of FIG. 1 consists of a body 36, a plurality of cylinders 38, and a plurality of supports 40 for supporting the cylinders 38 away from the body. In forming the cylinder-developed or bullet gear 12 on a gear shaper, only the cylindrical tips 38 perform cutting, and in fact, only a region extending along an angle 42 of approximately 210° about the cylinder actually performs all of the cutting. The supports 40 can therefore be formed to any shape that is sufficiently cut away to prevent interference with cutting. A support shape indicated at 40a can be utilized to firmly support the cylindrical tip without interfering with cutting. The diameter 44 of each cylindrical tip is preferably about one-third the spacing 46 between the axes of adjacent cylindrical tips.

Figure 9:
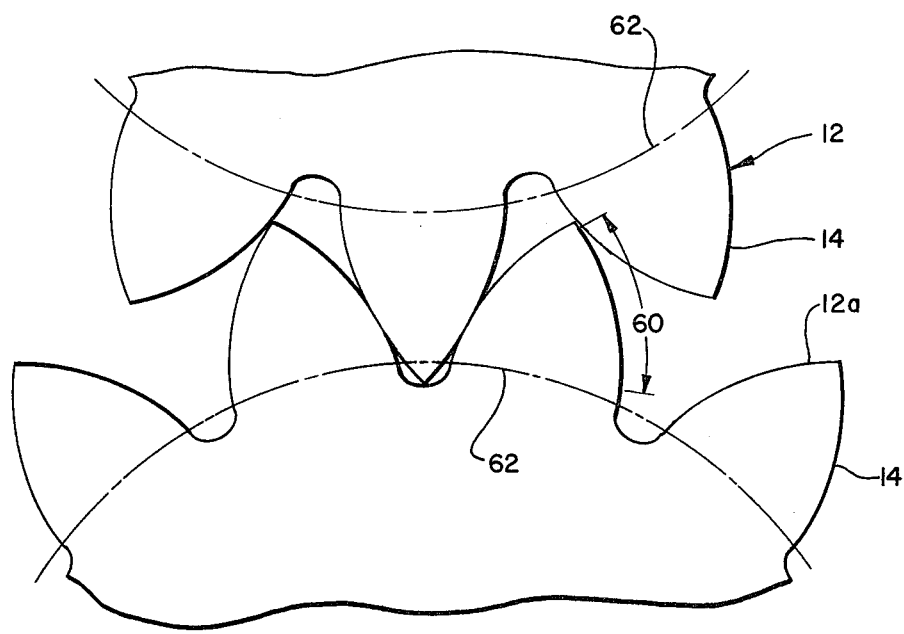
FIG. 9 is a partial view of a gear train utilizing a pair of bullet gears engaged with one another.

It has been found that pairs of planetary gears constructed in accordance with the present invention operate exceedingly well when engaged with one another in a gear train. The plan view of FIG. 3 is the same as the view of two gears 12, 12a of a gear train employing bullet gears of the present invention. It has been found that pairs of bullet gears rotate on one another with the surfaces of the gear teeth primarily rolling on one another and with the rolling action occurring along a large proportion of the tooth surfaces. FIG. 9 illustrates a portion of a pair of gears 12, 12a engaged with one another. Contact of the gears with one another extends along a wide region of each tooth, which includes the area between 60 of each tooth, along the side of the tooth which is driving or which is being driven. As a result, the two bullet gears provide smooth action and high efficiency, and with distributed wear, so that smaller gears can be utilized to transmit given loads, while providing a longer lifetime of use than prior art gears.

Figure 5:
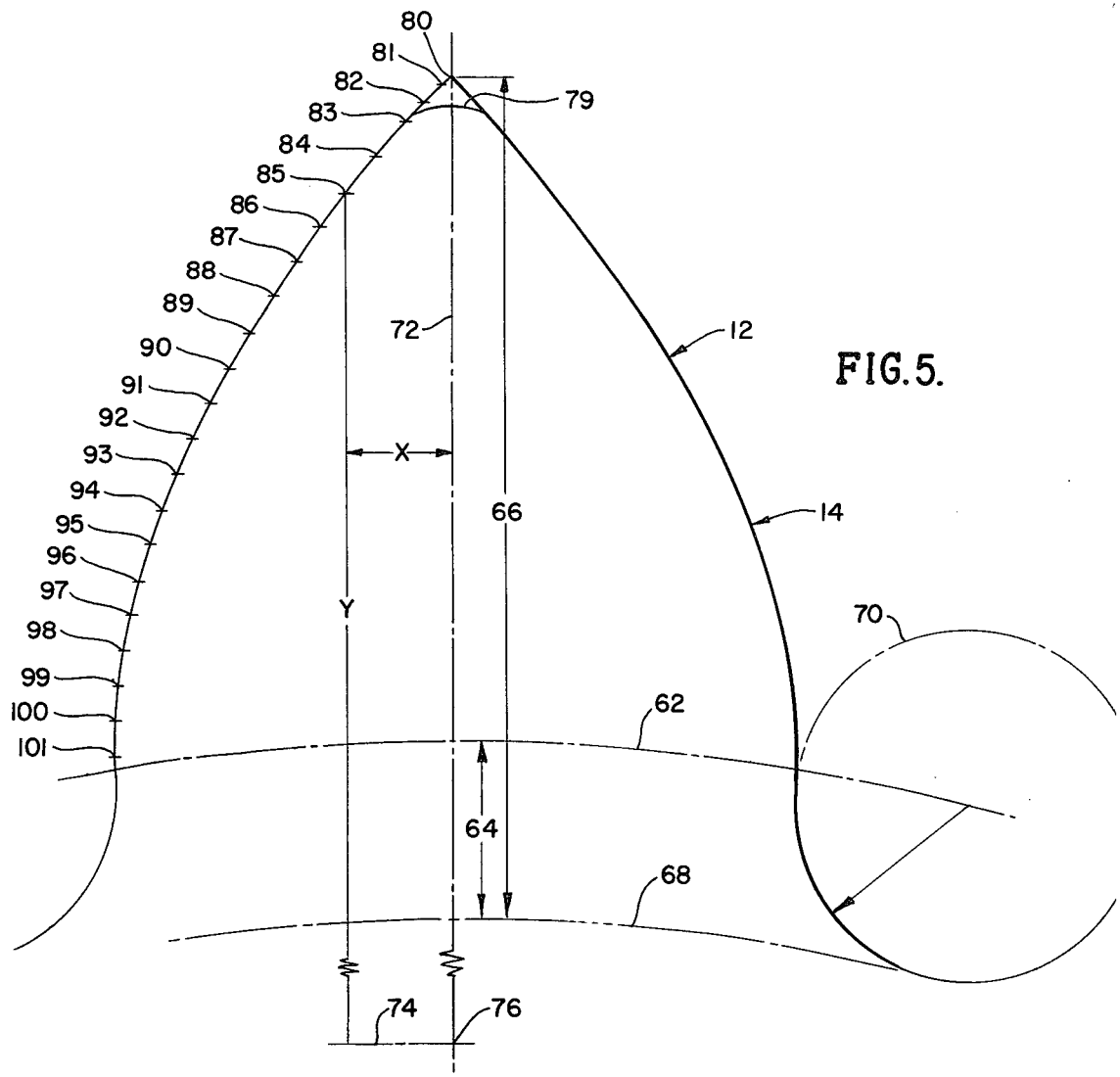
FIG. 5 is an enlarged view of one of the teeth of the developed gear 12 of FIG. 1.

The shape of each tooth 14 of a bullet gear can be defined in several different ways. As shown in FIG. 5, a pitch circle 62 is defined which extends near the bottom of the tooth. The pitch circle 62 is spaced from the bottom of the tooth, as measured from the dedendum circle 68, by a distance 64 which is approximately 26% of the entire height 66 of the tooth. The dedendum of the gear (the portion below the pitch circle) lies substantially on a circle 70 centered on the pitch circle 62. The addendum of the gear, which is the portion lying above the pitch circle 62, may be defined by the locations of the points 80-101 indicated in FIG. 5, as defined in the following table, for a 13 tooth gear. In the table the distance X is the distance from the center line 72 of the gear and the distance Y is the distance from an imaginary line 74 which passes through the axis 76 of the gear and which is perpendicular to the center line 72, the gear has 13 teeth and a radius of 0.80097 inch.

|     | X      | Y      |
| --- | ------ | ------ |
| 80  | .00000 | .80097 |
| 81  | .00272 | .79849 |
| 82  | .00804 | .79349 |
| 83  | .01300 | .78849 |
| 84  | .02228 | .77849 |
| 85  | .03060 | .76849 |
| 86  | .03811 | .75849 |
| 87  | .04497 | .74849 |
| 88  | .05144 | .73849 |
| 89  | .05763 | .72849 |
| 90  | .06352 | .71849 |
| 91  | .06928 | .70849 |
| 92  | .07466 | .69849 |
| 93  | .07952 | .68849 |
| 94  | .08386 | .67849 |
| 95  | .08732 | .66849 |
| 96  | .09030 | .65849 |
| 97  | .09280 | .64849 |
| 98  | .09486 | .63849 |
| 99  | .09640 | .62849 |
| 100 | .09728 | .61849 |
| 101 | .09745 | .60849 |

In constructing the above gear, the tip thereof was rounded along the line 79, which reduced the actual diameter of the gear by 14 mil (thousandth of an inch). One disadvantage of the present gears, as compared with standard involute gears is that the spacing of the axes of a pair of meshed gears must be precisely controlled. The rounding of the tips prevents interference of the gears if they are mounted at axes that are slightly too close together.

As illustrated in FIG. 8, the shape of each tooth 18 of the sun gear can be approximated by a pair of ellipses 82, 84. The tip portion 18t of the tooth has a cross-section which is substantially 200° of a 45° ellipse whose length extends in a circumferential direction. The recess 26 between teeth can be defined substantially by 200° of an isometric (approximately 35°) ellipse 84 whose length 86 is approximately 3 times the length 88 of the 45° ellipse 82 and whose length dimension extends radially. Of course, the foregoing is merely an approximation of the pole-shaped tooth of a sun gear. The tip portion 18t of the tooth 18 does not serve any function during operation of the sun gear in the above gear pump, but is only the result of development by the planetary gear in the manner shown in FIG. 2. Accordingly, the tips of the sun gear above a pre-determined pitch circle 90 may be removed, if desired, to leave stub teeth. The pitch circle 90 of the sun gear with pole-like teeth, lies near the extreme periphery, or addendum circle of the gear at a height preferably more than two-thirds the total height of the teeth, as measured between the dedendum and the addendum circles of the gear.

In the gear pump, the gears are positioned, as indicated in FIG. 8, with the pitch circle 62 of the planetary gear 12 tangent to the pitch circle 90 of the sun gear. A separation of the axes of the planetary and sun gears is the same as is used in the generation of one gear by the other (or by a cutter identical to the other), as in a manner shown in FIG. 2. If a planetary gear 12 and a sun gear 18 generated from the planetary gear, are held with their peripheral portions pressed against one another, the separation of their axes is the same as is used in the gear pump.

When two bullet gears, such as those shown at 12 and 12a (FIG. 3) are to be run on one another, their axes are mounted at a separation distance equal to the distance utilized during generation of one gear from the other (or from an identical cutter gear), as in the process of FIG. 3. It can be seen that the pitch circles 62 of the two gears 12, 12a do not intersect one another.

In the generation of the gears of the present invention, the separation distance of the axis of the cutter from the axis of the gear blank determines the shape of the generated gear. In one example, the initial cutter 10 of FIG. 1 is constructed with cylinders 38 of a diameter 44 of 0.100 inch, spaced apart by a distance 46 of 0.296 inches. The gear 12 to be cut has 13 teeth and therefore must have a pitch diameter 110 equal to 0.296 times 13 divided by pi, which equals 1.226 inches. Thus, the distance from the axis 112 of the gear blank for the bullet gear 12 and the pitch circle of the initial cutter 10 is one-half of 1.226 inch. The distance 114 between the axis of rotation 116 of the initial cutter and its pitch circle equals the distance 46 between teeth times the number of teeth on the cutter, divided by pi.

When making the setup of FIG. 2, the distance between the axes 102, 108 of the planetary and sun gears can be calculated in the same manner as in FIG. 1. The pitch diameter of the planetary gear 12 is 1.226 inches, as derived above. The pitch diameter of the sun gear equals the tooth spacing (0.296 inch) times the number of teeth (24 teeth) divided by pi. The two gears are positioned so their pitch circles are tangent, and therefore their axes are separated by a distance equal to the sum of their pitch diameters divided by 2.

In making the setup of FIG. 3, where both gears 12, 12a are to be identical, the separation of the axes 102, 110 of the two gears is equal to the pitch diameter of the gear 12, plus the distance between the tip of a tooth 14 and the pitch circle 62, this distance being determined by measurement and equal to 0.188 inch for the earlier described gear. If the axis 110 of the gear blank is moved a distance s closer to the axis 102 of the cutter, so that the pitch circle 62 of gear 12a is tangent to the pitch circle of the other cutter gear 12, then the gear blank will be cut to form post-like teeth (shown in phantom lines at 117) similar to those of the sun gear, instead of forming bullet-like teeth.

As mentioned above, the planetary gear 12 with bullet-like teeth can be utilized to cut either a sun gear with post-like teeth or another planetary gear. The sun gear, 16 can be utilized to cut a planetary gear, but is not efficient for this operation because all cutting by the sun gear would be performed by the rounded tips thereof, which would soon wear. A sun gear with elliptical tooth tips could be used instead the initial cutter 10 with cylindrical tooth tips, except that it is difficult to design the teeth of the sun gear. The bullet-like teeth 14 of the planetary gear, are of the general type commonly referred to as an enlarged tooth form, since the width of each tooth along the pitch circle is greater than the space between teeth as measured along the pitch circle. Each tooth 18 of the sun gear may be referred to as having a reduced tooth form, since the width of the recess between teeth is greater than the width of each tooth, as measured along the pitch circle of the gear. For use in the gear pump of the present invention, a large recess between teeth is desirable because this allows more fluid to be trapped in the recess between teeth.

In the commercial manufacture of the present gears for a gear pump, it is desirable to use one planetary gear to cut both the sun gear and other planetary gears, in order to help assure proper meshing of gears without requiring exceedingly small tolerances. One method for high production of gears of the present invention involves the cuttng of only one gear 16 and 12A using the operations of FIGS. 1-3. Then the gears 16 and 12A are utilized to form cavities for mass production. Each gear is formed by filling the cavity with powder, compressing the powder, and sintering the resulting gear.

Thus, the invention provides novel types of gears and methods for producing them, and provides an improved gear pump. The gears can be formed by using an initial cutter having tips which perform all of the cutting and that are portions of cylinders. The initial cutter can be used to form a gear with bullet-shaped teeth, and this gear can be utilized as a cutter to form additional gears with bullet-shaped teeth or with post-shaped teeth. By varying the distance between the axis of a cutter gear and the axis of the gear to be cut, gear teeth of different shapes can be obtained. A gear pump of the type wherein fluid is pumped through radial passages in the sun gear, can be made more efficient by utilizing planetary and sun gears with teeth of the shape which results from the gear-forming method of the invention. Additionally, a pair of gears with bullet-shaped teeth of the invention can be utilized in a gear train to transmit motion with largely rolling engagement of one gear with the other.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. Gear apparatus comprising:
a gear having a plurality of teeth, each tooth having a shape identical to the shape of a cylinder-developed gear produced by first shaping a gear blank on a gear shaper, using as a cutter a first gear having teeth with the tips thereof forming at least 180° of a cylinder to form the cylinder-developed gear.

2. Gear apparatus comprising:
a gear having a plurality of teeth, each tooth having a shape identical to the shape of a third gear produced by first shaping a gear blank on a gear shaper, using as a cutter a first gear having teeth with the tips thereof forming at least 180° of a cylinder to form a second gear, and then using the resulting second gear as a cutter on the gear shaper to produce the third gear.

3. A gear comprising:
a gear body with an axis at the center and a plurality of teeth at the periphery, each tooth having a tip portion whose cross section is substantially 200° of a 45° ellipse, and with the gap between teeth being defined substantially by 200° of a 35° ellipse whose length is approximately 3 times the length of said 45° ellipse, with the length of said 35° ellipse extending radially and the length of said 45° ellipse extending circumferentially.

4. A gear comprising:
a gear body with an axis at the center, a plurality of teeth at the periphery, each of said teeth being symmetrical about a corresponding bisecting radial line, and the surface of the tooth on one side of the bisecting line lying on the following defined coordinate points, where the dimension X of a point equals the distance between the bisecting radial line and the point, and the dimension Y of the point equals the distance from the point to a line perpendicular to said radial line, and the units of length for the X and Y axis are the same:

| Y | X |
|---|---|
| .768 | .031 |
| .758 | .038 |
| .748 | .045 |
| .738 | .052 |
| .728 | .058 |
| .718 | .064 |
| .708 | .070 |
| .698 | .075 |
| .688 | .080 |
| .678 | .084 |
| .668 | .088 |
| .658 | .091 |
| .648 | .093 |
| .638 | .095 |
| .628 | .097 |
| .618 | .097 |
| .608 | .098 |

5. A gear comprising:
a gear member having a plurality of teeth, each tooth having the shape illustrated in FIG. 5.

6. A gear train comprising:
a sun gear with each tooth thereof of the same shape as a post tooth shape which is produced by shaping a gear blank on a gear shaper, using as a cutter a gear having tips forming at least 180° of a cylinder to form a bullet gear, and using the bullet gear as a cutter on a gear shaper to produce the sun gear; and
a planetary gear meshed with said sun gear, each tooth of said planetary gear having the same shape as a tooth of said bullet gear.

7. The gear train described in claim 6 wherein:
the distance between the dedendum circle of said sun gear and the pitch circle thereof, is more than 75% of the distance between the dedendum circle thereof and the addendum circle thereof;
the distance between the dedendum circle of the planetary gear and the pitch circle thereof, is less than 25% of the distance between the dedendum circle thereof and the addendum circle thereof; and
said sun and planetary gears are positioned with their pitch circles tangent.

* * * * *